United States Patent
Dahmouni

(10) Patent No.: US 9,979,745 B2
(45) Date of Patent: May 22, 2018

(54) METHOD AND APPARATUS FOR TRANSMITTING INFORMATION

(71) Applicant: GIESECKE & DEVRIENT GMBH, München (DE)

(72) Inventor: Youssef Dahmouni, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 155 days.

(21) Appl. No.: 14/913,753

(22) PCT Filed: Aug. 25, 2014

(86) PCT No.: PCT/EP2014/002323
§ 371 (c)(1),
(2) Date: Feb. 23, 2016

(87) PCT Pub. No.: WO2015/028142
PCT Pub. Date: Mar. 5, 2015

(65) Prior Publication Data
US 2016/0205131 A1    Jul. 14, 2016

(30) Foreign Application Priority Data
Aug. 26, 2013 (DE) .......... 10 2013 014 187

(51) Int. Cl.
*H04L 29/06* (2006.01)
*G06Q 20/34* (2012.01)

(52) U.S. Cl.
CPC ....... *H04L 63/1441* (2013.01); *G06Q 20/352* (2013.01); *H04L 63/0492* (2013.01);
(Continued)

(58) Field of Classification Search
CPC ......... G06K 19/0723; G06K 19/07336; G06K 7/10019; H04Q 2213/13095; H04W 4/008; H04W 12/02
See application file for complete search history.

(56) References Cited

U.S. PATENT DOCUMENTS 5,537,105 A * 7/1996 Marsh ................... G01S 13/758
340/10.1
5,550,547 A * 8/1996 Chan .................... G06K 7/0008
342/42

(Continued)

OTHER PUBLICATIONS

Vogt, Efficient Object Identification with Passive RFID Tags, Dec. 2002, Springer, 16 Pages.*
(Continued)

*Primary Examiner* — Farid Homayounmehr
*Assistant Examiner* — Christopher C Harris
(74) *Attorney, Agent, or Firm* — Workman Nydegger

(57) ABSTRACT

A method for transmitting information from a first security module to a second security module involves a system comprising the first and the second security modules. An anti-collision phase comprises a sequence of anti-collision queries, and a communication phase follows the anti-collision phase. The first security module transmits the information to be transmitted to the second security module in the anti-collision phase by sending responses of the first security module to the sequence of anti-collision queries, with the information to be transmitted being encoded in the responses of the first security module. The second security module decodes the information to be transmitted from the sequence of the received anti-collision queries. Furthermore, the invention discloses a first and a second security module, in particular for transmitting information.

17 Claims, 5 Drawing Sheets

(52) U.S. Cl.
CPC ........ *H04L 63/067* (2013.01); *H04L 63/0853* (2013.01); *H04L 63/1408* (2013.01); *H04W 4/80* (2018.02)

(56) References Cited

U.S. PATENT DOCUMENTS

| | | | | |
|---|---|---|---|---|
| 5,856,788 | A | * | 1/1999 | Walter ................. G06K 7/0008 235/375 |
| 5,986,570 | A | * | 11/1999 | Black ................. G06K 7/10039 340/10.2 |
| 6,002,344 | A | * | 12/1999 | Bandy ................. G06K 7/0008 340/10.2 |
| 6,774,766 | B1 | * | 8/2004 | Moyer ................. G06K 7/0008 340/10.3 |
| RE42,344 | E | * | 5/2011 | Wood, Jr. ............. G06K 7/0008 340/10.1 |
| 8,902,073 | B2 | * | 12/2014 | Busch-Sorensen ......................... G06K 19/07336 340/10.1 |
| 2002/0130766 | A1 | * | 9/2002 | Hulvey ................. G06K 7/0008 340/10.31 |
| 2004/0223481 | A1 | | 11/2004 | Juels et al. |
| 2005/0263591 | A1 | * | 12/2005 | Smith ................. G06K 7/0008 235/385 |
| 2006/0273176 | A1 | | 12/2006 | Audebert et al. |
| 2007/0052525 | A1 | | 3/2007 | Quan et al. |
| 2007/0057791 | A1 | * | 3/2007 | Karjoth ................ G06K 7/0008 340/572.1 |
| 2008/0106383 | A1 | * | 5/2008 | Choi ................... G06K 7/0008 340/10.2 |
| 2011/0084796 | A1 | | 4/2011 | Savry |

OTHER PUBLICATIONS

Bagnato et al., Performance analysis of anti-collision protocols for RFID systems, Jun. 12, 2009, IEEE, 5 Pages.*
Myung et al.; Tag-Splitting: Adaptive Collision Arbitration Protocols for RFID Tag Identification; Jun. 2007; IEEE; 13 Pages.*
Law et al; Efficient Memoryless Protocol for Tag Identification; Aug. 1, 2000; ACM; 10 Pages.*
Blaskiewicz et al., "RFID System with Allowers," IEEE International Conference on Pervasive Computing and Communications, 2009, pp. 1-6, URL: http://ieeexplore.ieee.org/stamp/stamp.jsp?tp=&arnumber=4912898 [abgerufen am Feb. 20, 2014 im Internet].
German Search Report for corresponding German Application No. 102013014187.7, dated Feb. 21, 2014.
International Search Report for corresponding International PCT Application No. PCT/EP2014/002323, dated Dec. 1, 2014.

* cited by examiner

ID2=10011010
Release code FC=1110

| Step | 300 ID$_2$ | 200 ID$_1$ | 100 |
|---|---|---|---|
| Q1 | | | -> IDs? |
| Q2 | 1 0 0 1 1 0 1 0 | 1 0 0 0 x x x x | |
| Q3 | | | Collision col=3 |
| Q4 | | | -> IDs col=3? |
| Q5 | col=3 | col=3 -> OK | |
| Q6 | 1 0 0 1 1 0 1 0 | 1 0 0 1 1 1 1 0 | |
| Q7 | | | Collision col=5 |
| Q8 | | | IDs col=5 |
| Q9 | FC$_1$=11-- | | |
| Q10 | 1 0 0 1 1 0 1 0 | 1 0 0 1 1 0 1 0 | |
| Q11 | | | no collision; ID=10011010 |
| Q12 | | | select 10011010 |
| Q13 | FC$_2$=--10 Release code=1110 | | |

} Recognition of presence
} Establishment of release code

Fig. 4

Intermediate memory

METHOD AND APPARATUS FOR TRANSMITTING INFORMATION

BACKGROUND

This invention concerns a method, in particular for data communication, in a system comprising a first and a second security module. An anti-collision phase comprises a sequence of anti-collision queries, with the anti-collision phase being followed by a communication phase.

The development of security modules in the form of chip cards and the use of RFID (radio-frequency identification) have led to a rise in the employment of chip cards for contactless data transfer. Use is made here in particular of contactless chip cards for different applications, for example for authentication, upon the release of transactions or the control of access authorizations. In spite of the currently low range of RFID, it frequently happens that a plurality of chip cards are present in the reader field of a card reader. To begin a communication with the "right" chip card, the card reader must identify the chip cards located in the reader field.

In principle, a card reader (communication device) is provided only for communication with one chip card. If at least one chip card is recognized by the communication device, the latter performs the anti-collision method. The communication device thereby sends an initial query with a request to all chip cards located in the action radius (reader field) of the communication device to identify themselves. If a plurality of identical identification features are received by the communication device, the communication device carries out a separating method. The separating method contains as a rule a second (and/or further), more detailed query. Where applicable, the communication device can identify the chip card or plurality of chip cards from the responses to the queries. Therefore, the anti-collision method comprises at least an initial query and, where applicable, a separating method. The identification and possibly selection of a chip card is not necessary for terminating the separating method.

A communication of the card reader with two chip cards is therefore not possible simultaneously, but only alternatingly. By means of an amplifier the range of RFID systems can be increased. A user therefore no longer has to deliberately bring a chip card, for example a payment card, into the reader field of the card reader. Therefore, it is possible for an attacker to eavesdrop on the communication between payment card and card reader. Further, an attacker could begin a communication with the payment card and perform transactions himself.

Accordingly, there is an interest in protecting contactless chip cards from unwanted communication. In this connection it has been proposed to use a second chip card as a so-called blocker tag (blocking card) to already prevent identification of the payment card by the card reader at the beginning. For this purpose, the blocker tag takes part in the anti-collision method in a targeted manner and disturbs it. This means that the blocker tag for example responds to every query of a card reader and therefore simultaneously and equivalently with the payment card, so that a collision is recognized by the terminal. For this purpose, the blocker tag has an identification feature that comprises the identification feature of the payment card. A separation and therefore identification of the chip cards located in the action radius of the card reader within the context of an anti-collision phase is therefore prevented as long as the blocker tag remains in the action radius of the terminal.

However, as soon as an attacker has recognized that a blocking card is being employed for protecting the payment card, he could attempt to bypass this protection. For example, he could attempt to access the payment card with his reader by means of another method.

SUMMARY

The invention is therefore based on the object of showing a possibility for solving the problems of the prior art and increasing the security of security modules.

The method concerns a system which comprises a first and a second security module. Further, an anti-collision phase comprises a sequence of anti-collision queries, with the anti-collision phase being followed by a communication phase. According to the invention it is provided that the first security module transmits information to be transmitted to the second security module in the anti-collision phase by sending responses of the first security module to the sequence of anti-collision queries. The information to be transmitted is contained encoded in the responses of the first security module. Further, the second security module decodes the information to be transmitted from the sequence of the anti-collision queries.

In principle, the security module can be a portable data carrier, such as a chip card, a secure mass memory card or a USB token. For contact-type communication with an end device, portable data carriers can be insertable into the end device reversibly. The security module can also be a security module firmly incorporated into an end device, such as a Trusted Platform Module (TPM), a near-field communication (NFC) module, an M2M module, a user identification module or a decoder module. The security module is a hardware security module. These options apply independently of each other to the first and/or the second security module. For example, the second security module can be a portable data carrier and the first security module a firmly integrated security module.

The method according to the invention employs the second security module as a regular security module, for example a payment card. The first security module serves security purposes. It sends information to the second security module to make one or more functions possible to the second security module. The information may be for example a release code, a function code and/or other personal information, in particular an employee number, customer number, account number, biometric information and/or addresses. The information can also be only a partial information item which is assembled with another partial information item in the second security module. The first security module utilizes the anti-collision phase for information transmission from the first security module to the second security module. This means that in principle the communication and the data exchange of a communication device with the second security module, for example the payment card, is not prevented by the first security module and/or the second security module disabled. However, the payment card is preferably released for a certain transaction or a certain contingent, for example, only after a successful exchange, for example of a certain release code. Since the information to be transmitted is encoded in the responses of the first security module, it is in principle difficult for an attacker to read out the information from the responses of the first security module. This is additionally impeded since the information is not transferred from the first security module to the second security module in a single pass, but rather the second security module only decodes the information to be transmitted from the sequence of the anti-collision queries.

Therefore, the security and simultaneously the ease of use of the second security module are increased compared with conventional systems.

The communication device serves for communication with the security module and can be a card reader provided in particular as a mobile unit for example on a cash register system, as a firmly installed device, in particular for access control, or as an integrated system in a notebook, mobile phone, computer or keyboard.

Since according to the method at least the first and second security modules are located in an active field of an electromagnetic field of a card reader, a collision method takes place due to the conventional behavior of the card reader. The responses of the first security module are formulated such that they influence the anti-collision queries. Thus, the first security module deterministically influences the anti-collision behavior, so that the first security module determines the content of a following query in the anti-collision phase by the one response to a query in the anti-collision phase. The information to be transmitted can therefore be transmitted to the second security module via the responses of the first security module and thereby via the sequence of collision queries.

With the method according to the invention, information can thus be transmitted from the first security module to the second security module without changing parameters and/or the architecture on the environment of the first and second security modules, for example on a communication device, as well as the equipment connected thereto. The structure of the first and second security modules also requires no constructional change. Therefore, implementation and application in existing systems would be possible any time without technical or financial effort.

As already to be supposed, the second security module is for example a payment card. The first security module can be for example a so-called release card and/or PIN card. The first and second security modules do not have to be present in a conventional card form, for example in the form ID-1, but can respectively be for example incorporated in a device, preferably embedded in a mobile telephone, or configured in an arbitrary form, for example a ring or a tag. In principle it is possible that the first and/or second security module can be configured as an embedded, firmly installed module or as an interchangeable module.

In one embodiment, the information to be transmitted from the first security module to the second security module is transmitted via the anti-collision protocol. This means that the information to be transmitted is encoded by the first security module directly into the response of the first security module to an anti-collision query. The information to be transmitted contained in the response of the first security module is therefore contained in the following anti-collision query. Depending on how the response of the first security module is configured, the response can influence the contents of the sequence of anti-collision queries such that the anti-collision query following the response follows a certain scheme. In so doing, the collision behavior as well as the anti-collision method of the communication device are taken into consideration. With this embodiment the information to be transmitted can be contained directly in the anti-collision query. An additional communication from the first security module need not take place. Further, in particular upon an attack the information to be transmitted can be established by the attacker only with great effort. For this purpose, the attacker must already know many features of the first and second security modules as well as for example the anti-collision behavior of the communication device.

In particular, the information to be transmitted could already be transmitted as a response to the initial query and at least one further anti-collision query, namely a separating query. For this purpose, an authorization or release of certain functions of the second security module is for example already possible at the beginning. On this basis, the behavior of the second security module for an existing session can be controlled, inter alia.

Further, it can be provided that the second security module stores the information to be transmitted after reception thereof. The information to be transmitted can be stored as a whole, preferably successively. The successive storing of the information to form whole information results from the sequence of anti-collision queries that transmit the information. Depending on the employed algorithm for decoding by the second security module, the transmitted information can be deposited, being assembled from the sequence. Alternatively, only portions of the transmitted information can also be stored separately, in particular in the case of portion-by-portion transmission. For example, the transmitted information can consist of a plurality of partial information items. Each partial information item can perform different functions in the second security module. Other possibilities are also conceivable, for example storing contents of the anti-collision queries.

Further, it can also be provided that only a flag, i.e. a one-bit value, is set when the information to be transmitted corresponds to a certain pattern or value. Preferably, the first security module is employed as a security card or release card, so that when a certain first security module and/or a group of first security modules is present, one or more functions are released. In so doing, there can be stored on the basis of the transmitted information from the first security module to the second security module a security information item that is required for executing commands, a communication or an application. Thus, the second security module could be for example a payment card which requires, instead of a user inputting the PIN on a control panel, only the first security module to be present in the environment. The information to be transmitted would finally be a substitute for inputting the PIN.

Alternatively, a user could also convey to the second security module through the presence of the first security module that certain, preferably all, functions may be executed. The information to be transmitted serves to authenticate the first security module toward the second security module, whereupon the second security module stores a security information item after a successful check, where applicable. Alternatively, the second security module could be used in a mobile telephone, so that certain functions of the mobile telephone, for example an electronic purse or network services, are released with the first security module.

Further, it can be provided that the information to be transmitted is a release code, preferably a one-time password (OTP). Said release code can firstly be used merely for releasing one or more certain functions.

In one embodiment, it can be provided that a communication phase of the second security module following the anti-collision phase can be begun only after a successful check of the transmitted release code by the second security module. For this purpose, the second security module evaluates the information to be transmitted, in particular the transmitted release code, and determines whether the second security module may take part in the communication phase. For this purpose, a release code is already deposited in the second security module, or the second security module establishes on the basis of an algorithm that the transmitted release code is accepted. The release code can be configured dynamically or statically. In particular when the release code is dynamic, it can be provided that the second security module determines the correctness via for example a mathematical model, in particular a check digit.

Further, it can be provided that a check takes place that no further security module is disturbing, influencing and/or intercepting the transmission of the responses of the first security module and second security module as well as the queries of the communication device. For this purpose, the first security module can for example utilize two anti-collision queries, preferably the initial query and an anti-collision query following the initial query. In one method, an identification number of the first security module is for example adapted to the identification number of the second security module, with the identification number of the first security module having a negation at only one bit location relative to the identification number of the second security module. After transmission of the first and second identification numbers upon the initial query, a collision is therefore effectuated at the communication device, whereupon the communication device sends a further anti-collision query, namely a collision query. From the collision query the first security module recognizes by comparison of the collision bit with the negated bit location whether a further security module is present. Further, the first security module can recognize from the collision query whether the second security module is actually the "right" security module.

The responses of the first security module are, in one embodiment, configured dynamically in accordance with the preceding query of the communication system and at least one short-term goal, in particular a certain influence on the content of the following anti-collision query. A short-term goal could be to force a certain query. The first security module therefore deterministically influences the contents of the sequence of following collision queries via each of its responses to each anti-collision query. This means that the first security module formulates its response to the collision query such that the information to be transmitted is contained in the next collision query so as to be decodable for the second security module. For this purpose, it can be advantageous when the first security module knows the anti-collision behavior of the communication device.

To determine the anti-collision behavior of the communication device, the first security module could initially effectuate a blocking and therefore a collision deliberately upon an anti-collision query. After an analysis of one or more following anti-collision queries, the first security module can determine the anti-collision behavior. The first security module can therefore adapt the responses to the anti-collision queries in accordance with a pattern of the anti-collision behavior. It is thus possible for the first security module to control the behavior of the communication device, in particular the content of the anti-collision queries of the communication device, at least bitwise using the responses. Further, the first security module can perform a physical adapting, in particular sending the responses in a certain frequency range or in a certain time interval.

In the method according to the invention, it can be provided that upon a first anti-collision query of the sequence of the anti-collision queries the response of the first security module is a first response. The first security module evaluates said first anti-collision query. In accordance with the evaluation result of the first anti-collision query, the first security module encodes the information to be transmitted with the first identification number of the first security module into a first transmission number. The first transmission number is finally integrated in the first response. Preferably, upon encoding, the information to be transmitted is mixed with the first identification number such that the information to be transmitted fills up the identification number from the last location.

The first security module can receive a further anti-collision query from the sequence of anti-collision queries, evaluate it and create a further response in accordance with the evaluation result. In so doing, the information to be transmitted is encoded with the first identification number of the first security module into a further transmission number, and the further transmission number is integrated in the further response. It is noted here, however, that the further anti-collision query contains a collision indication, and the further transmission number is created with consideration of the collision indication. In so doing, only the bit locations of the information to be transmitted that follow the bit location of the collision are incorporated with regard to the first identification number. A further collision with the second identification number of the second security module can no longer take place at the same bit location, but only at a following bit location. These steps can be repeated analogously until the information is transmitted as a whole and no collision query is received.

In one embodiment of the method, it can be provided that the second security module sends a regular response to every anti-collision query of the sequence of anti-collision queries. A regular response describes a response that would be sent out on the basis of a conventional behavior of the second security module. The regular response usually comprises the second identification number of the second security module. The first response of the first security module respectively effectuates with the regular response of the second security module a collision at a collision location m. The collision query comprises a collision information item on a preceding collision.

As mentioned above, the first security module can, for forming each further transmission number, adapt the preceding transmission number on the basis of the collision indication about the collision location m of the preceding transmission number of the anti-collision query. Preferably, the preceding transmission number is negated only at the collision location m of the preceding transmission number.

For encoding the information to be transmitted with the first identification number, it can be provided that the information to be transmitted covers at least parts of the first identification number. This is a simple possibility of information transmission when the first identification number is adapted, in particular equivalent, to the second identification number. This requires, however, that the second security module knows which bit locations of the second identification number are occupied by the information to be transmitted. In an especially advantageous embodiment, the information to be transmitted superimposes the first and therefore second identification number from their last bit location.

For transmitting the information, the latter is preferably contained in a contiguous sequence in the transmission number of the first security module. Since the second security module knows the start bit location of the encoded information to be transmitted in relation to the second identification number, the second security module compares a collision indication of a collision query at the collision bit location n with the second identification number. From the comparison a first part of the information to be transmitted can therefore be determined. The first part of the information to be transmitted therefore consists of an area beginning with the start bit location up to the collision bit location m, with the collision bit location m being negated. When the second security module receives a further collision query there is employed as a new start bit location $m_{new}$ the $(m_{old}+1)$th bit location, and the next part of the location to be transmitted would accordingly be described by the interval of the bit locations]$m_{old}+1$; $m_{new}$]. Here, too, the new collision bit location $m_{new}$ is negated. $m_{old}$ describes the collision bit location of the last collision. The steps for establishing the subportions of the information are carried out by the second security module until the second security element receives a query that is not a query within the context of an anti-collision phase. In this case, the last subportion of the information to be transmitted describes the interval for the bit locations from and excluding the last collision bit location up to the last bit location of the information to be transmitted contained in the second identification number. Alternatively to the negated collision bit location, the interval of the subportions can also be defined as offset by one bit location, namely [$m_{old}$; $m_{new-1}$]. In this method, the collision bit location does not have to be negated, however. The information to be transmitted is assembled from the sequence of subportions. The second security module can therefore decode the information to be transmitted from the bit length of the information to be transmitted, the bit length and the content of the second identification number and the negated mth bit location of the second identification number.

Therefore, the information to be transmitted is not only transmitted within an anti-collision cycle. Rather, the information is transmitted over a plurality of anti-collision cycles. The second security module assembles the information to be transmitted from the respectively previously determined subportions, which achieves a considerable added value for secure data transmission. The assembled subportions can additionally be present encrypted in particular in an encoded order, so that an algorithm can also be employed for decryption and/or for assembling.

Preferably, the first identification number corresponds identically to the second identification number. Therefore, the information to be transmitted can already be transmitted from the first anti-collision query in a targeted manner with regard to the second security module.

A first security module according to the present invention for transmitting information to a second security module comprises a memory unit, a transmitting and receiving unit and a processing unit. The processing unit is configured for analyzing a query and creating a response. The query here is a query within the context of an anti-collision phase. The first security module is characterized in that the response is configured so as to influence the anti-collision behavior of the communication device, with the information being encoded in the response of the first security module.

In one aspect, the first security module can be configured to transmit the information to be transmitted via the anti-collision protocol. The anti-collision protocol is an already employed transmission protocol. Since a known and employed transmission protocol is employed, no changes with regard to either the software or the hardware have to be made for example in the infrastructure. This means that no changes or adaptions need to be made for example on already installed card reader systems. The transmission of information using the first security module according to the invention is therefore possible without technical effort, for example changing an existing system. Further, the first security module is usable directly in every system with the second security module.

Further, it can be provided that the first security module is arranged for carrying out one of the above-described methods and/or is configured for taking part in one of the above-described methods.

A second security module according to the invention is configured for carrying out one of the above-described methods and/or for taking part in one of the above-described methods.

BRIEF DESCRIPTION OF THE DRAWINGS

The invention will hereinafter be explained further by way of example with reference to the drawings. There are shown:

FIG. 4 an example of an information transmission according to the invention;

DETAILED DESCRIPTION OF VARIOUS EMBODIMENTS

For a clearer view and improved comprehension, identical reference signs designate identical or functionally identical components and/or steps, unless otherwise stated. For the queries, commands and responses only excerpts are respectively shown. The queries, commands and responses can of course comprise a plurality of constituents in terms of content.

Figure 1:
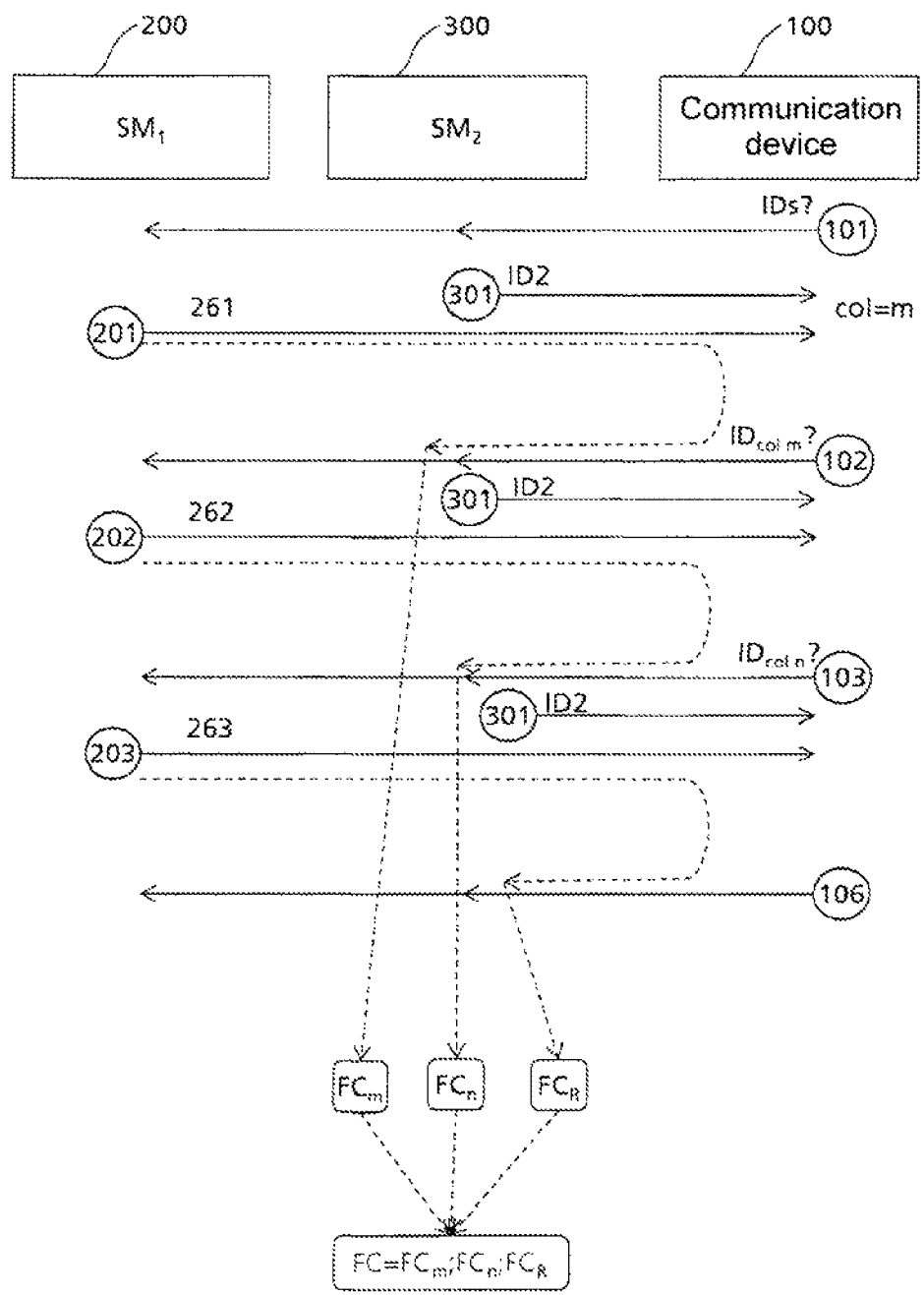
FIG. 1 an exemplary schematic representation for transmission of information from a first security module to a second security module.

In FIG. 1 is represented by way of example a communication method for transmitting information from a first security module (SM$_1$) 200 to a second security module (SM$_2$) 300. In this embodiment example, the information is a release code FC. After the first and second security modules 200, 300 have come into the action radius of a communication device 100, the communication device 100 sends a first query 101. With the first query 101 the communication device 100 asks all security modules located in the action radius to send an identification feature (IDs?). The first query 101 here is a first anti-collision query, a so-called initial query. The first query 101 is received both by the first security module 200 and by the second security module 300.

After reception of the first query 101 by the second security module 300, the first query 101 is processed and a regular response 301 is sent. The regular response 301 comprises a second identification number ID$_2$ of the second security module 300. After the first security module 200 receives the first query 101, the release code FC is encoded by the first security module 200 with a first identification number ID1 of the first security module 200 into a first transmission number 261. In this example, the first identification number ID1 is identical to the second identification number ID2. The first transmission number 261 is subsequently incorporated into the first response 201 of the first security module 200 and sent to the communication device 100. The first response 201 and regular response 301 effectuate a collision at the bit location m (col=m) in the communication device 100.

The collision of the first response 201 and regular response 301 prompts the communication device 100 within the context of the anti-collision phase to send a further, second query 102 for identification by the security modules. The second query 102 is likewise an anti-collision query, but a so-called collision query. In the second query 102 an indication of the collision location m is contained.

The first security module 200 receives the second query 102. Subsequently the first security module 200 forms a new, second transmission number 262. The second transmission number 262 differs from the first transmission number 261 in that the first transmission number 261 is present negated at the collision location m. The second transmission number 262 is sent to the communication device 100 in the second response 202.

After reception of the second query 102 by the second security module 300, the latter sends the first regular response 301 with the second identification number ID2. Since the second security module 300 knows the bit length of the release code, the second security module 300 could establish the release code FC by comparing the second identification number ID2 with the collision indication from the second query 102. For this purpose the second security module 300 knows, due to the method according to the invention, that the release code FC is only deemed to be completely transmitted when no query with a collision indication is received from the communication device 100. This would mean that the anti-collision phase is ended. Since a collision indication of the collision bit location m is present, the second security module 300 assumes that the release code FC is not yet completely transmitted. However, the release code FC coincides from the start bit location up to and including the negated collision bit location m with its own, second identification number ID2, so that a first portion of the release code $FC_m$ is formed.

The first regular response 301 and second response 202 are received by the communication device 100 and effectuate a collision at the bit location n. Thereupon the communication device 100 sends a third query 103 for identification by the security modules with a collision indication of the collision bit location n.

The third query 103 is received by the security module 200. In so doing, the first security module 200 negates the previously sent second transmission number 262 at the bit location n and sends the new third transmission number 263 encoded in the third response 203.

Further, the third query 103 is received by the second security module 300. Since the third query 103 is a collision query, the second security module 300 recognizes that the release code FC is not yet completely transmitted. The second security module 300 establishes a second portion of the release code $FC_n$ by considering the collision indication (collision at the bit location n) and the second identification number ID2. The second portion of the release code $FC_n$ therefore concerns the second identification number $ID_2$ from and excluding the bit location m up to and including the negated bit location n. Since the third query 103 is a query within the context of an anti-collision phase, the second security module 300 re-sends the first regular response 301 with the second identification number $ID_2$.

The communication device 100 receives the first regular response 301 and third response 203 and ascertains no collision in the present case. Thereupon the communication device 100 begins with a selection of the second security module 300 via a first command 106.

The first security module 200 receives the first command 106 (for example Select ID2) and recognizes therefrom that the anti-collision method has been terminated, whereupon the first security module 200 carries out no communication with the communication device 100 and in particular refrains from processing commands.

The second security module 300 likewise recognizes from the first command 106 that it does not involve a query within the context of the anti-collision phase. A third, remaining, portion of the release code $FC_R$ is therefore formed from and excluding the bit location n up to and including the last bit location of the second identification number ID2. Finally, the first, second and third portions $FC_m$, $FC_n$, $FC_R$ of the release code FC are assembled, thereby yielding the release code FC. Subsequently, the second security module 300 compares the established release code FC with a release information item stored in the second security module 300. If the comparison leads to a positive result, the second security module 300 is released for a data communication with the communication device 100, and/or the employment for confirming a transaction. Otherwise the second security module 300 is disabled for a transaction.

The transmission of the release code FC is restricted to three anti-collision queries here only by way of example. A skilled person will immediately recognize that there may also be only two queries or a multiplicity of queries within the context of an anti-collision phase. Accordingly, the information to be transmitted can be assembled from two or more portions. However, in principle the number of portions depends here on the difference and the type of the information encoded in the responses, and the second identification number.

Figure 2:
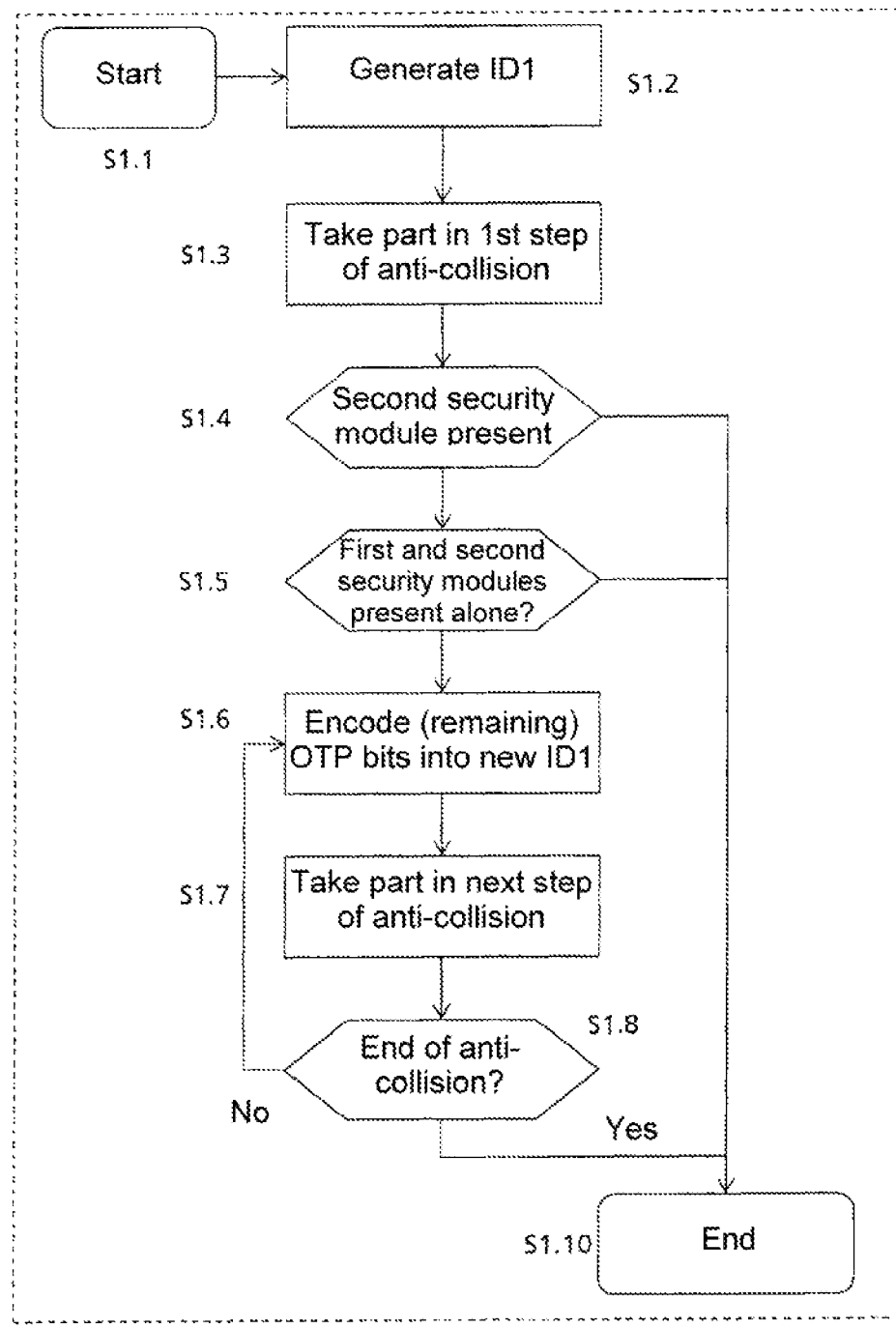
FIG. 2 an exemplary flowchart of the method according to the invention for the first security module.

In FIG. 2 are shown a plurality of steps in the first security module 200 for transmitting information from the first security module 200 to the second security module (not represented) in accordance with an embodiment example according to the invention. After the first security module 200 and second security module were brought into the action radius of the communication device (not represented) in the step S1.1, the first security module 200 receives a start query from the communication device. Said start query is already to be understood as a query within the context of an anti-collision phase, namely as an initial query. The communication device is thereby asking the security modules present for identification. In the step S1.2 the first security module 200 generates a first identification number ID1, which preferably differs only slightly from the second identification number of the second security module. For example, the first identification number ID1 is inverted relative to the second identification number only at one bit location a. The first security module 200 sends the first identification number ID1 to the communication device and therefore takes part in a first step of the anti-collision method (S1.3).

The communication device establishes a first collision and thereupon sends a first collision query. From the first collision query the first security module 200 recognizes whether the second security module is present (S1.4) and whether further security modules are possibly present (S1.5). For this purpose it is analyzed at which bit location the first collision took place. If the bit location of the first collision corresponds to the bit location a, it can be assumed with a certain probability p that the second security module is the "right" second security module. The probability p is computed via the formula However, if the bit location of the first collision does not correspond to the bit location a, $$p = \frac{2^o - 1}{2^o},$$

a further security module is also present and/or the second security module is not present. In the case that the second security module is not present and/or the first security module 200 and second security module are not present in the action radius of the communication device alone, the communication with the communication device is aborted. A further communication between the first security module 200 and the communication device is prevented for the current session in this example (S1.10). This can be done for example by storing blocking information.

If the bit location of the first collision corresponds to the bit location a, the first security module 200 and second security module are present in the action radius of the communication device alone with high probability. Further, the first security module 200 establishes that the second security module is the "right" second security module. Thereupon the information to be transmitted is encoded with a new first identification number ID1 into a transmission number in a step S1.6. The new first identification number ID1 preferably corresponds to the second identification number of the second security module. The information will hereinafter be a password, a so-called "one-time password" (OTP). After the transmission number is formed it is sent to the communication device as a response to the first anti-collision query in the step S1.7, so that the first security module 200 takes part in the next anti-collision step.

Subsequently, a further query is received from the communication device in the step S1.8 and it is checked whether said further query is an anti-collision query, in particular a collision query.

In the case of a positive check result the first security module 200 takes part repeatedly in the further steps of the anti-collision and performs the steps S1.6 to S1.8 again. However, the preceding transmission number is respectively employed as a basis and adapted to the collision indication of the anti-collision query. Thus the collision bit corresponding to the collision indication is respectively negated in the step S1.6. The new transmission number is finally re-sent in the step S1.7.

A negative check result leads the first security module 200 to the finding that the information, for example an OTP, was transmitted to the second security module. The communication for the current session with the communication device is finally ended (S1.10).

Figure 3:
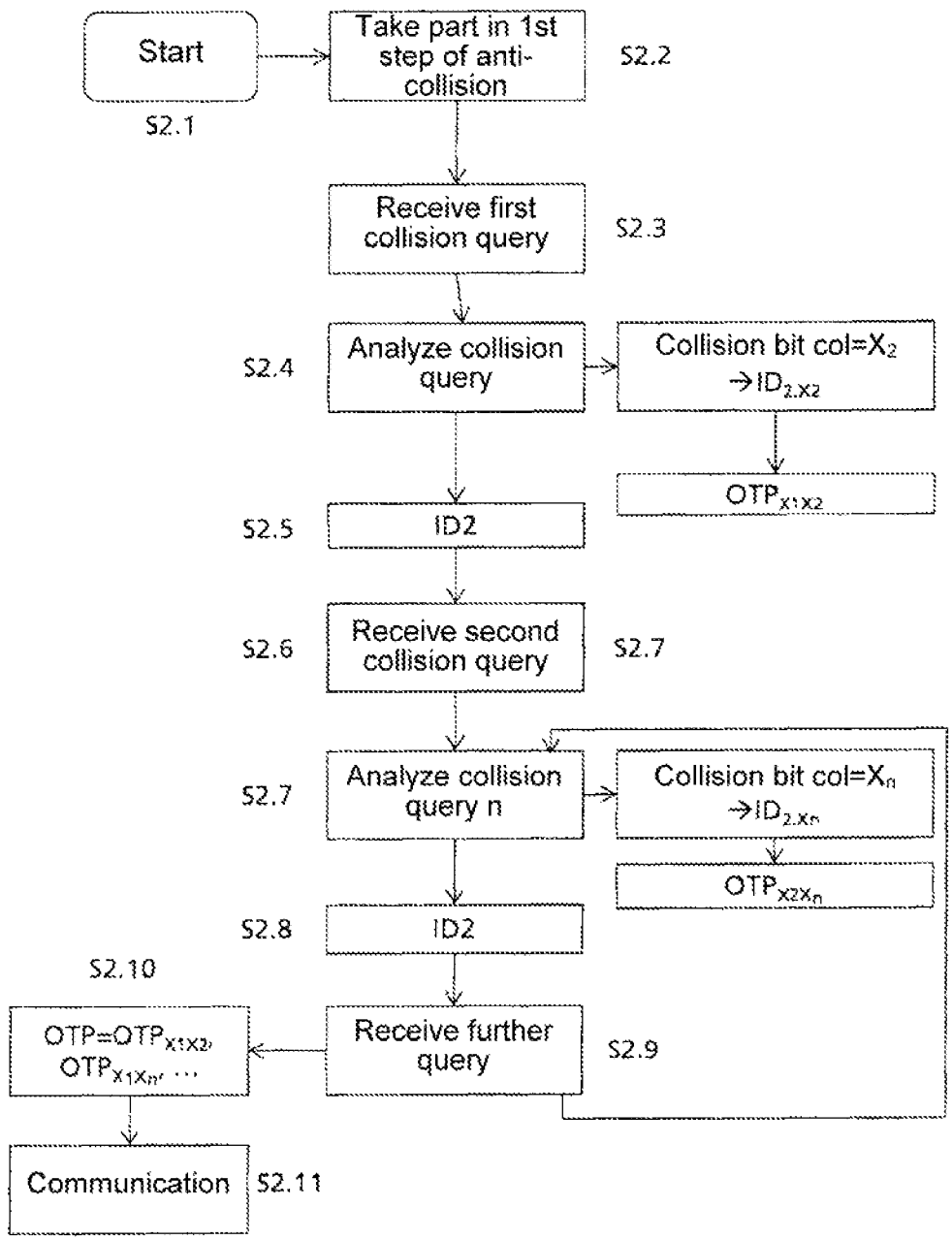
FIG. 3 an exemplary flowchart of the method according to the invention for the second security module.

More generally, the steps for the first security module 200 can therefore be formulated as follows:

S1.1: Start (initial start)
S1.2: Generate a first ID1 in dependence on the second identification number
S1.3: Take part in the first step of the anti-collision method by sending the first identification number ID1
S1.4: Check whether second security module is present
S1.5: Check whether first security module 200 and second security module are present in the action radius of the communication device alone
S1.6: Encode the information with the first identification number ID1 into a (new) transmission number
S1.7: Send the transmission number
S1.8: Check whether the further query is a query within the context of an anti-collision phase; where:
  if the further query is a query within the context of an anti-collision phase,
  the steps S1.6 to S1.8 are repeated; and
  in the step S1.6 from the further query the values of the information to be transmitted that are probably not yet captured by the second security module (remaining bits) are encoded with the second identification number into a new transmission number; and
  if the further query is not an anti-collision query, step S1.10 is performed S1.10: End of communication FIG. 3 shows for the second security module 300 steps for transmitting the information from the first security module 200 (not represented) to the second security module 300 with reference to an embodiment example. In a first step S2.1 the second security module 300 is brought into the action radius of the communication device (not represented). As this happens, the communication device sends the start query (initial query). Since the second security module 300 is addressed with the start query, it takes part in the anti-collision phase (S2.2). In so doing, the second security module 300 sends a regular response which comprises the second identification number ID2 of the second security module 300.

Subsequently, the second security module 300 receives the first collision query in the step S2.3. In the step S2.4 the second security module 300 checks whether the first anti-collision query is a query within the context of an anti-collision phase. The second security module 300 establishes on the basis of a collision information item (collision indications) contained in the first anti-collision query a collision bit $ID_{2,X2}$ at the location X2 of the second identification number $ID_2$. The second security module 300 also knows the bit length and the start bit of the OTP. From the start bit, the bit length of the OTP and/or the bit length of the second identification number ID2 the second security module 300 determines the starting point of the OTP $ID_{2,X1}$ in relation to the second identification number ID2. A first portion of the OTP: $OTP_{X1X2}$ therefore results from the second identification number 300

$$[ID_{2,X1}, \ldots, ID_{2,X(2-1)}, \overline{ID}_{2X2}]$$

where $\overline{ID}_{2X2}$ describes the negative bit value for the collision bit $ID_{2,X2}$ of the second identification number $ID_2$. Upon the first collision query the second security module 300 re-sends the regular response with the second identification number $ID_2$ in the step S2.5.

In the present example, a second collision query is sent due to a collision established by the communication device, and received by the second security module 300 in the step S2.6. Since the second collision query concerns the second security module 300, the second security module 300 analyzes the second collision query in the step S2.7. On the basis of the second collision query a second collision information item about the collision established by the communication device at the bit location n is communicated to the second security module 300 (col=Xn). From said collision information item the second security module 300 determines the collision bit $ID_{2,Xn}$, as well as the second portion of the OTP: $OTP_{X2Xn}$ from the second identification number analogously to the first portion of the OTP $OTP_{X1X2}$:

Further, it takes part in this anti-collision method and the second security module 300

$$[ID_{2,X(2+1)}, \ldots, ID_{2(n-1)}, \overline{ID}_{2,Xn}]$$

sends the regular response with the second identification number ID2 upon the second collision query in the step S2.8. Subsequently, a further query is received by the second security module 300 in the step S2.9. If the further query is a collision query, one proceeds further with the step 2.7 analogously to the second query. If the further query is not a collision query, one proceeds further with the step 2.10.

If the step S2.10 yields that the further query is not a query within the context of an anti-collision phase, the OTP is determined as follows:

$$OTP=OTP_{X1,X2}, \ldots, OTP_{X2,Xn}; \ldots$$

Via a comparison result of the established OTP from the anti-collision method with a value stored/deposited in the second security module 300, a certain function can be released, for example carrying out transactions, and/or a communication (S2.11) with the communication device can take place.

In FIG. 4 is represented by way of example the information transmission from the first security module 200 to the second security module 300 on the basis of a concrete example with numbers. It is noted here that the first identification number ID1 of the first security module 200 is configured dynamically. The information to be transmitted is a release code FC with the content "1110". The represented table is intended to illustrate the computational method of information exchange for the steps Q1 to Q13. For exemplary description of the invention, there are respectively represented the dynamic first and the second identification number ID1, ID2 in the responses from the first security module 200 and second security module 300 and queries of the communication device 100 in the corresponding columns.

Within the context of an anti-collision phase the communication device 100 sends in the step Q1 a start query for identification numbers of the security modules located in the action radius: "IDs?" Upon the start query the second security module 300 answers in the step Q2 with its regular response with the second identification number ID2 "10011010" as the content. The first security module 200, in contrast, answers with a first identification number ID1 adapted to the second identification number ID2. The bit location 3 therein is inverted with respect to the second identification number ID2. The bit locations 4 to 7 can be filled arbitrarily with "xxxx". The difference between the first identification number ID1 and the second identification number ID2 is marked in bold in each line.

The first identification number ID1 and second identification number $ID_2$ are received by the communication device 100 and generate for the step Q3 a first collision "col=3" in the communication device 100. Upon the first collision established by the communication device 100 the communication device 100 creates for the step Q4 a first collision query, by which separating should take place.

Said first collision query is received in the step Q5 both by the first and the second security module 200, 300. Said first collision query contains a first collision information item on the first collision col=3. From the first collision information item the first security module 200 ascertains with high probability (see formula above) that the second security module 300 together with the first security module 200 are located alone in the action radius of the communication device 100. It results that the second security module 300 may take the further steps for transmitting the release code FC. The recognition of presence has therefore been terminated.

Upon the first collision query the second security module 300 answers with the regular response in the step Q6. This means that the second security module 300 sends its second identification number ID2 "10011010" to the communication device 100. The first security module 200, in contrast, encodes the release code "1110" into the first identification number ID1, with the release code FC filling and/or covering the first identification number $ID_1$ from the last bit location.

Therefore a first transmission number "10011110" arises. As can be recognized, the values of the bit locations 0 to 4 of the first transmission number are the same as the bit locations 0 to 4 of the second identification number ID2. The changed bit locations of the first transmission number are marked in each line by low lines in the transmission number. In the step Q6 the first security module 200 sends the first transmission number to the communication device 100, and the second security module 300 the second identification numbers ID2.

In the step Q7 the communication device 100 receives the first transmission number and second identification number ID2 and ascertains a collision at the bit location 5 (marked in bold at Q6). Thereupon the communication device 100 sends in the step Q8 a second collision query with regard to the collision at the bit location 5 with the collision information item col=5.

After reception of the second collision query the second security module 300 recognizes in the step Q9 that a second anti-collision query was sent. The second security module 300 therefore establishes that the expected release code FC is being sent in at least two subportions, but in the present case a first subarea FC1 can be established. Said first subarea FC1 consists of the bit locations 4 and 5. Use is made here of all bit locations relevant for the release code FC with the second identification number ID2 up to the collision location col=5, with the value of the collision location being negated. There thus results as a first subarea of the release code: $FC_1$="11". For the release code FC it follows that: FC=11??.

Upon the second collision query the second security module 300 re-sends the regular response with the second identification number ID2 in the step Q10. The first security module 200 forms from the collision information item col=5 a negation at this bit location in comparison to the first transmission number, resulting in a second transmission number "10011010". Subsequently, the first security module sends said second transmission number.

In the step Q11 the communication device 100 receives the second transmission number and regular response, with the communication device 100 not recognizing a collision. Thereupon the communication device selects the second security module 300 via the second identification number ID2 (select 10011010) as step Q12.

In the step Q13 the second security module 300 recognizes from the query and/or command of the communication device 100 that an anti-collision query is no longer involved. The anti-collision method has now been terminated. The second and last subarea of the release code $FC_2$ is therefore determined from the second identification number ID2 up to the last bit location of the second identification number $ID_2$, while employing the bit locations following the last collision location (col=5): $FC_2$="10". Since the anti-collision method has been terminated, the subareas of the release code FC are assembled: release code FC=$FC_1$; $FC_2$="1110". Said release code FC can be compared with a value deposited in the memory. On the basis of the check result the second security module 300 is released for a further data communication, for carrying out a transaction and/or for a block of functions. Further, the behavior of the second security module 300 upon certain queries and/or commands of the communication device can be controlled by the release code.

As to be recognized from this example, the first security module 200 influences the query behavior of the communication device 100 on the basis of the formed first and second transmission numbers in connection with the first identification number ID1. Since the first security module 200 knows the second identification number ID2, a collision can be obtained at certain locations in a targeted manner in the anti-collision method, so that the anti-collision protocol is used for transmitting information. However, this necessitates a dynamic behavior of the first identification number or transmission number.

Figure 5:
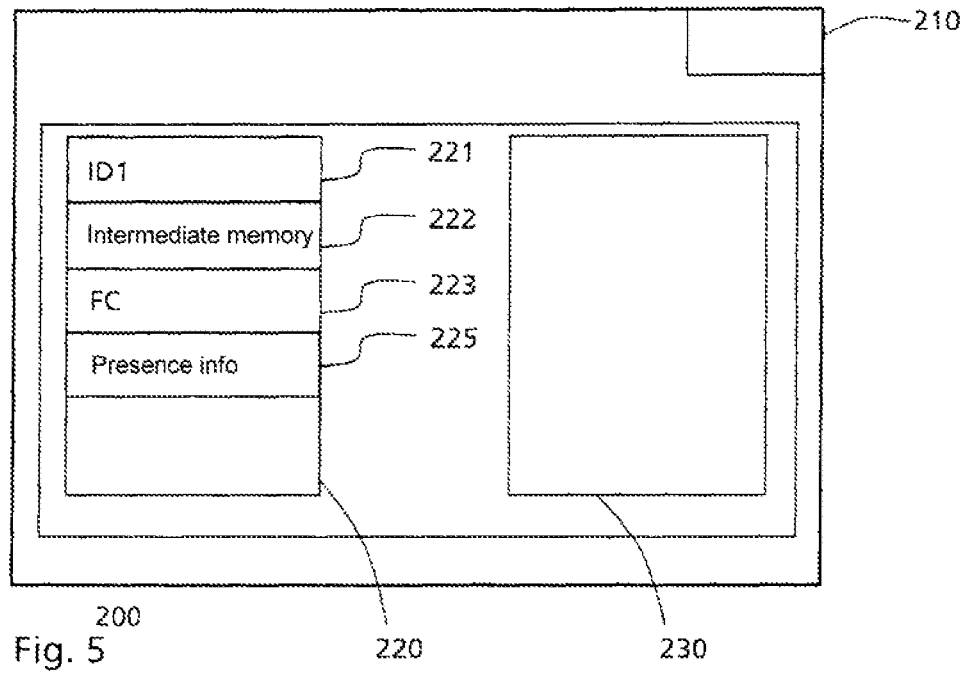
FIG. 5 an embodiment of the first security module

FIG. 5 represents schematically an exemplary structure of the first security module 200. The first security module 200 comprises a first transmitting and receiving unit 210, a first memory area 220 and a first processing unit 230. The first memory area 220 has a memory location 221 for receiving a first identification number ID1, a first intermediate memory 222, a first memory location 223 for the release code FC, and a first memory location 225 for receiving a presence information item. In the first intermediate memory 222 there can be deposited for example intermediate results from the first processing unit 230, which comprise one or more transmission numbers and/or one or more collision information items.

The first processing unit 230 serves for processing queries from the communication device and for creating responses to the communication device. In so doing, the queries can be analyzed and, where applicable, information from the first memory area 220 used, inter alia. Preferably, the first processing unit 230 knows the procedure of the communication device in the anti-collision method, to thereby prepare responses in a targeted manner from the first query on. Therefore, the communication device can be influenced upon forming new queries. Using the created responses it is thus possible to control the content of the following responses at least partly and to transmission information.

As mentioned above, the first identification number ID1 is configured dynamically and can vary in accordance with the specifications of the first processing unit 230.

Figure 6:
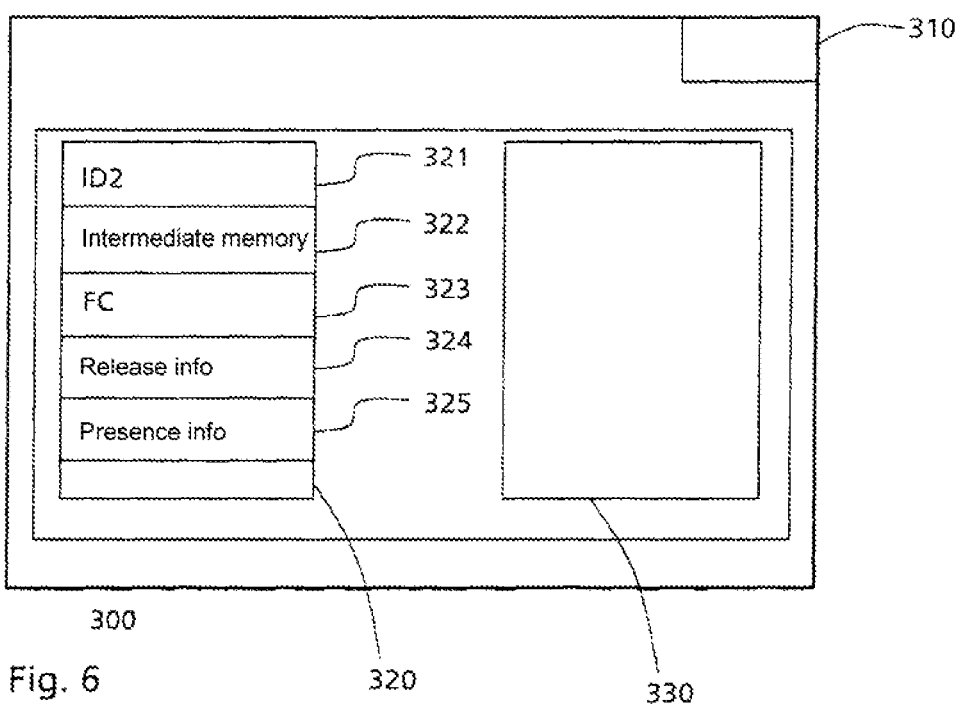
FIG. 6 an embodiment of a second security module

In FIG. 6 the structure of the second security module 300 is represented purely schematically in an exemplary embodiment. The second security module 300 comprises a second transmitting and receiving unit 310, a second memory area 320 and a second processing unit 330. In the second memory area 320 there is a second memory location 321 for the second identification number ID2, a second intermediate memory 322, a second memory location 323 for receiving the release code FC, a memory location for receiving a release information item 324, as well as a second memory location 325 for receiving a second presence information item. Via the second presence information item 325 there can be indicated, inter alia, whether the first security module (not shown) is present together and/or alone with the second security module 300, it being executed for example as one bit, for example as a flag.

The release information item 324 states in this embodiment example whether the release code FC was transmitted from the first security module, the release code FC corresponds to the release code FC stored in the second security module 300 in the second release code memory 323 and/or which function of the second security module has been released. Further, the release information item 324 can be utilized to disable a part or all of the second security module 300, so that only certain functions are deactivated, a data communication with the communication device (not represented) is restricted and/or completely prevented for the current session.

In the intermediate memory 322 there can be deposited for example subareas of the transmitted release code as intermediate results. The processing unit 330 serves for processing queries received from the communication device and for formulating responses. In so doing, it also carries out the examination, analysis and comparison upon the anti-collision queries between the collision indication, possible intermediate results and the second identification number ID2.

While the transmission of the information in two subareas is represented particularly in FIG. 4, storing only the collision location may also be sufficient, instead of storing the part of the information, and the values of the subareas of the information can be determined via the collision location and therefore the total information when the anti-collision phase is ended.

As indicated by the embodiment examples, the first and second security modules 200, 300 are configured in accordance with each other. This means that the first security module 200 must already know features of the second security module 300. Therefore, it is also advantageous when the second security module 300 has information about the processing of the first security module 200, for example whether the first security module carries out a presence recognition of further security modules.

The above-described memory areas and features contained in the memory can be contained either in a memory separate from the processing unit or else partly in a memory contained in the processing unit. Therefore, each processing unit could also comprise a memory itself. For the memory, different memories can in principle be used. Thus, a permanent memory would be expedient for example for the second identification number, whereas a volatile memory can be provided in particular for the first identification number and/or transmission number. Each of the described processing units could be a CPU which has a microprocessor.

The invention claimed is:

1. A method in a system comprising a first and a second security module, with an anti-collision phase comprising a sequence of anti-collision queries, and a communication phase following the anti-collision phase;
    wherein the first security module transmits information to be transmitted to the second security module in the anti-collision phase by sending responses of the first security module to the sequence of anti-collision queries, with the information to be transmitted being encoded in the responses of the first security module; and
    the second security module decodes the information to be transmitted from the sequence of the received anti-collision queries,
    wherein upon a first anti-collision query of the sequence of the anti-collision queries the response of the first security module is a first response, the first security module evaluates the first anti-collision query and, in accordance with the result of the evaluation, for encoding the information to be transmitted in the first response;
        (a1) the information is encoded with a first identification number of the first security module into a first transmission number, and
        (b1) the first transmission number is integrated into the first response.

2. The method according to claim 1, wherein the information to be transmitted is transmitted from the first security module to the second security module via the anti-collision protocol.

3. The method according to claim 1, wherein the second security module stores security information including authentication data after reception of the transmitted information.

4. The method according to claim 1, wherein the information to be transmitted is a release code that, when verified, releases one or more functions within the system.

5. The method according to claim 4, wherein the release code releases the second security module for the communication phase.

6. The method according to claim 1, wherein the first and/or second security module checks whether a further security module is present in the environment thereof.

7. The method according to claim 1, wherein the responses of the first security module are configured dynamically and the first security module deterministically influences contents of the sequence of the anti-collision queries via each of the responses.

8. The method according to claim 1, wherein the first security module receives from the sequence of anti-collision queries a further anti-collision query, evaluates it and, in accordance with the result of the evaluation, in a further response
   c1. the information to be transmitted is encoded with the first identification number of the first security module into a further transmission number, and
   d1. the further transmission number is integrated in the further response.

9. The method according to claim 1, wherein the second security module sends a response upon each anti-collision query of the sequence of anti-collision queries, with the regular response comprising a second identification number of the second security module, and
   the first and further responses of the first security module effectuate with the regular response of the second security module a collision at a collision location n and each anti-collision query has a collision information item.

10. The method according to claim 9, wherein the first security module, for forming each further transmission number, adapts said further transmission number to the collision location n of the preceding transmission number and/or negates it at the collision location n of the preceding transmission number.

11. The method according to claim 10, wherein the second security module decodes the information to be transmitted from the bit length of the information, the bit length and the content of the second identification number and a negation of the nth bit location of the second identification number.

12. The method according to claim 1, wherein the information to be transmitted masks parts of the first identification number.

13. The method according to claim 1, wherein the second security module determines a part of the information to be transmitted from each of the sequence of anti-collision queries and forms the information to be transmitted after the end of the sequence of anti-collision queries.

14. A first security module for transmitting information to be transmitted to a second security module, comprising a memory unit, a sending/receiving unit and a processing unit, with the processing unit being configured for analyzing a query and creating a response, and the query being a query within the context of an anti-collision phase, wherein the response is configured so as to influence anti-collision behavior of the communication device, with the information being contained encoded in the response,
   wherein upon a first anti-collision query of a sequence of anti-collision queries the response of the first security module is a first response, the first security module evaluates a first anti-collision query and, in accordance with the result of the evaluation, for encoding the information to be transmitted in the response;
      (a1) the information is encoded with a first identification number of the first security module into a first transmission number, and
      (b1) the first transmission number is integrated into the response.

15. The first security module according to claim 14, wherein the information to be transmitted is transmitted to the second security module via the anti-collision protocol.

16. The first security module according to claim 15, wherein the first security module is configured for performing a method in a system comprising a first and a second security module, with an anti-collision phase comprising a sequence of anti-collision queries, and a communication phase following the anti-collision phase;
   wherein the first security module transmits information to be transmitted to the second security module in the anti-collision phase by sending responses of the first security module to the sequence of anti-collision queries, with the information to be transmitted being encoded in the responses of the first security module; and
   the second security module decodes the information to be transmitted from the sequence of the received anti-collision queries.

17. The first security module according to claim 14, wherein the second security module sends a response upon each anti-collision query of the sequence of anti-collision queries, with the regular response comprising a second identification number of the second security module, and
   the first and further responses of the first security module effectuate with the regular response of the second security module a collision at a collision location n and each anti-collision query has a collision information item.

* * * * *